United States Patent
Inayoshi

(10) Patent No.: US 8,282,523 B2
(45) Date of Patent: Oct. 9, 2012

(54) PLANETARY ROLLER REDUCER

(75) Inventor: Fumio Inayoshi, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1128 days.

(21) Appl. No.: 12/159,378

(22) PCT Filed: Nov. 21, 2006

(86) PCT No.: PCT/JP2006/323186
§ 371 (c)(1),
(2), (4) Date: Jun. 26, 2008

(87) PCT Pub. No.: WO2007/074595
PCT Pub. Date: Jul. 5, 2007

(65) Prior Publication Data
US 2010/0227725 A1    Sep. 9, 2010

(30) Foreign Application Priority Data
Dec. 27, 2005    (JP) ................. 2005-374801

(51) Int. Cl.
*F16H 13/06* (2006.01)
*F16H 57/08* (2006.01)
(52) U.S. Cl. .................. 475/183; 475/347; 475/348
(58) Field of Classification Search .............. 475/183, 475/347, 348
See application file for complete search history.

(56) References Cited

U.S. PATENT DOCUMENTS

| | | | |
|---|---|---|---|
| 4,454,437 A | 6/1984 | Tanaka et al. | |
| 2003/0099417 A1* | 5/2003 | Bauer et al. | 384/535 |
| 2004/0082420 A1* | 4/2004 | Robinson | 475/183 |
| 2005/0049050 A1 | 3/2005 | Hoshino | |
| 2006/0040779 A1* | 2/2006 | Tsurumi et al. | 475/183 |

FOREIGN PATENT DOCUMENTS

| | | |
|---|---|---|
| EP | 1 452 419 A1 | 9/2004 |
| JP | 50-26286 U | 3/1975 |
| JP | 58-70060 U | 5/1983 |
| JP | 6-74313 A | 3/1994 |
| JP | 6-307512 A | 11/1994 |

(Continued)

OTHER PUBLICATIONS

European Search Report Dated Nov. 17, 2011.

(Continued)

*Primary Examiner* — Edwin A Young
(74) *Attorney, Agent, or Firm* — Birch, Stewart, Kolasch & Birch, LLP

(57) ABSTRACT

The planetary roller reducer, which is directly coupled to a motor, is provided with a casing (6), an input shaft (3) accommodated inside the casing and directly coupled to an output shaft (2) of the motor (1), an input shaft bearing (20) set between the casing and the input shaft to support the input shaft so as to rotate with respect to the casing, a sun shaft (4) installed on the input shaft, a carrier (8) accommodated in the casing, a plurality of planetary rollers (13) supported on the carrier so as to rotate and in external contact with the sun shaft, an elastic ring (5) accommodated in the casing and in internal contact with a plurality of the planetary rollers, and a first elastic member (25*a*) installed between the input shaft bearing and the input shaft to elastically support the input shaft.

19 Claims, 10 Drawing Sheets

FOREIGN PATENT DOCUMENTS

| | | |
|---|---|---|
| JP | 11-505309 A | 5/1999 |
| JP | 2000-320633 A | 11/2000 |
| JP | 2001-21017 A | 1/2001 |
| JP | 2002-300748 A | 10/2002 |
| JP | 2003-72567 A | 3/2003 |
| JP | 2003-301905 A | 10/2003 |
| JP | 2005-80399 A | 3/2005 |
| JP | 2005-160240 A | 6/2005 |
| WO | WO-03/047948 A1 | 6/2003 |

OTHER PUBLICATIONS

Japanese Office Action dated Sep. 13, 2011 and an English Translation.

Japanese Notice of Allowance issued in Japanese Patent Application No. 2007-551866 on May 8, 2012.

* cited by examiner

PLANETARY ROLLER REDUCER

The present application is to claim the right of priority to the Japanese Patent Application No 2005-374801 filed on Dec. 27, 2005, with the content incorporated herein.

BACKGROUND OF THE INVENTION

1. Technical Field

The present invention relates to a planetary roller reducer.

2. Description of the Related Art

An explanation will be made for a planetary roller reducer by the rolling drive of conventional rollers by referring to FIG. 11. The reducer is provided with an input shaft 104 fitted in a tightening manner so as to be in agreement with an output shaft 102 of a motor 101, a sun shaft 104a installed so as to be extended from the input shaft 104 and arranged at the rotating center of the reducer, a plurality of planetary rollers 113 arranged with each other at equal intervals so as to enclose the sun shaft 104a and in external contact with the sun shaft 104a, an elastic ring 105 fixed to a casing 106 of the reducer and in internal contact with a plurality of the planetary rollers 113, a trunnion-type carrier 108 supported on the casing 106 so as to rotate, to which a pin shaft 111 for supporting the planetary roller 113 so as to rotate is fixed, and an output shaft 108a installed so as to be extended from the carrier 108 to take out the rotation of the carrier 108 (for example, refer to Patent Document 1 listed below).

The reducer is provided with an input bearing 120 set between the casing 106 and the input shaft 104 to support the input shaft 104 so as to rotate and an inner bearing 121 set between the carrier 108 and the leading end of the sun shaft 104 to support the sun shaft 104a directly coupled to the input shaft 104 so as to rotate. The planetary roller 113 is supported by the pin shaft 111 so as to rotate via a planetary roller bearing 122. The reducer is also provided with a pair of ball bearings 130 set between an inner boss of the casing 106 and the output shaft 108a to support the output shaft 108a so as to rotate.

Further, in order to prevent a side slip of the planetary roller 113 (that is, an axial slip), the reducer is provided on the sun shaft 104a with collars 104b, 104c for suppressing a lateral movement of the planetary roller 113.

Still further, a flange 109 for fixing the motor 101 to the casing 106 is formed on the casing 106 in such a manner that a socket portion 101a of the motor 101 is fitted inside. In order to fix the motor 101 to the casing 106, the output shaft 102 is fitted into a fitting hole of the input shaft 104 and the socket portion 101a is also fitted into the flange 109, thereby temporarily fixing the motor 101 to the casing 106 with screws (not illustrated). Then, the output shaft 102 is relatively positioned to the input shaft 104 to fit them in a tightening manner. Thereafter, the screws are tightened to fix the motor 101 to the casing 106, while care is taken so as not to influence the positional relationship between the output shaft 102 and the input shaft 104.

PATENT DOCUMENT 1: Japanese Unexamined Patent Application, First Publication No. H06-307512

SUMMARY OF THE INVENTION

Problems to be Solved by the Invention

In the above-constituted conventional planetary roller reducer, the output shaft 102 of the motor 101 and the sun shaft 104a thereof exhibit a core deflection resulting from an accumulated error of roundness of the sun shaft 104a, the planetary roller 113, the elastic ring 105 or others, at least a few hundredths of a millimeter in deflection width. The core deflection developed on the sun shaft 104a induces subtle gyrating motions of the input shaft 104 integrally formed with the sun shaft 104a. Thereby, a moment load acts on the input bearing 120 for supporting the input shaft 104 and the inner bearing 121 for supporting the sun shaft 104a or on the output shaft 102 of the motor 101 directly coupled to the input shaft 104 and a front bearing (not illustrated) of the motor 101 for supporting the output shaft 102, which may adversely influence the above-described components.

Further, in the conventional planetary roller reducer, a core deflection is found resulting from a fitting allowance of the socket portion 101a with respect to the flange 109 or a fitting allowance of the output shaft 102 with respect to the input shaft 104, thus increasing the gyrating motions. Therefore, in order to suppress the above-described gyrating motions, it is necessary to make an extremely strict adjustment when the output shaft 102 of the motor 101 is fitted into the input shaft 104. As a result, a considerable amount of time and labor in making the above adjustment is required.

The above-described gyrating motions are reduced when the core deflection of the input shaft 104 is corrected by the input-side ball bearing 120 and the sun-shaft ball bearing 121. However, an excessive force is applied to the input-side ball bearing 120 and the sun-shaft ball bearing 121 on correcting the core deflection of the input shaft 104 resulting in a possibility that they may be damaged. Further, when the gyrating motions are reduced to a smaller extent, an excessive force is applied to the front bearing (not illustrated) of the motor 101 resulting in a possibility that the front bearing may be damaged.

In order to avoid damage of these components, the output shaft 102 of the motor 101 may be coupled to the input shaft 104 of the planetary roller reducer via a flexible shaft joint. However, the planetary roller reducer is increased in size as a whole by the size of the thus required shaft joint, variously restricting the layout of individual parts on assembly of a machine.

Further, in the conventional planetary roller reducer, it is necessary to connect via the shaft joint the output shaft 108a installed on the carrier 108 to an input shaft of a machine to be driven. Therefore, the planetary roller reducer is increased in size as a whole by the size of the thus required shaft joint, variously restricting the layout of laying out individual parts on assembly of the machine.

Still further, when a side slip takes place on the planetary roller 113, torque is transmitted from the sun shaft 104a to each of the planetary rollers 113 at a different position due to the fact that these planetary rollers 113 are positioned differently, thus causing variation in rotation of the sun shaft 104a and transmission of the torque. Therefore, the collars 104b, 104c are installed on the sun shaft 104a to suppress lateral movements of the planetary rollers 113. However, each contact part will receive relative friction resulting from a difference in circumferential speed to develop unnecessary power loss and subtle friction.

The present invention has been made in view of the above-described circumstances, an object of which is to provide a planetary roller reducer highly reliable and excellent in workability on assembly. Another object of the present invention is to provide a planetary roller reducer capable of transmitting power smoothly without loss.

Means for Solving the Problems

The planetary roller reducer of the present invention, which is directly coupled to a motor, is provided with a casing, an input shaft accommodated inside the casing and directly coupled to an output shaft of the motor, an input shaft bearing set between the casing and the input shaft to support the input shaft so as to rotate with respect to the casing, a sun shaft installed on the input shaft, a carrier accommodated in a casing, a plurality of planetary rollers supported on the carrier so as to rotate and in external contact with the sun shaft, an elastic ring accommodated in the casing and in internal contact with a plurality of the planetary rollers, and a first elastic member installed between the input shaft bearing and the input shaft or between the casing and the input shaft bearing to support elastically the input shaft.

In the planetary roller reducer of the present invention, a fitting hole, the inner diameter of which is greater than the outer diameter of the output shaft of the motor may be formed on the input shaft, and a positioning mechanism for adjusting a relative position of the output shaft fitted into the fitting hole with respect to the input shaft may be installed on the input shaft.

In addition, when the size of a clearance between an outer circumferential surface of the output shaft of the motor and an inner circumferential surface of the fitting hole is denoted as G1 and the outer diameter of the output shaft is denoted as D1, a ratio of G1 to D1 (G1/D1) is preferably from 0.005% or more to 1.0% or less. Where a value of G1/D1 is less than 0.005%, there is a narrow region adjustable in positioning the output shaft of the motor to the input shaft, resulting in a possibility that the output shaft may not be positioned accurately to the input shaft. On the other hand, where a value of G1/D1 is greater than 1.0%, the output shaft of the motor is in contact with the input shaft at a smaller area, thus resulting in a possibility that force may be transmitted with loss from the output shaft to the input shaft. Where a value of G1/D1 is set in the above-described range, the output shaft of the motor can be easily positioned to the input shaft and also the power of the motor can be transmitted without loss from the output shaft to the input shaft.

In the planetary roller reducer of the present invention, a flange formed in such a manner that the socket portion of the motor fixed to the casing is fitted inside may be installed on the casing.

In addition, the size of a clearance between an inner surface of the flange and an outer surface of the socket portion is denoted as G2 and the outer diameter of the socket portion fitted inside the flange is denoted as D2, a ratio of G2 to D2 (G2/D2) is preferably from 0.05% or more to 2.50% or less. Where a value of G2/D2 is less than 0.05%, there is a narrow region in positioning the socket portion of the motor to the casing. Therefore, when the output shaft of the motor is accurately positioned to the input shaft, the socket portion interferes with the flange of the casing, which may consequently contribute to an inhibited rotation of the input shaft. On the other hand, where a value of G2/D2 is greater than 2.50%, there is an excessively wide region adjustable in positioning the socket portion of the motor to the casing, which may result in a failure of accurately positioning the motor to the casing. Where a value of G2/D2 is set in the above-described range, the motor can be easily positioned in the casing.

The planetary roller reducer of the present invention, which is directly coupled to a motor, is provided with a casing, an input shaft accommodated in the casing, an input shaft bearing set between the casing and the input shaft to support the input shaft so as to rotate with respect to the casing, a sun shaft installed on the input shaft, a carrier accommodated in the casing, a plurality of planetary rollers supported on the carrier so as to rotate and in external contact with the sun shaft, and an elastic ring accommodated in the casing and in internal contact with a plurality of the planetary rollers. The input shaft is provided with an input shaft main body to which the sun shaft is coupled, a boss coupled to the output shaft of the motor, a flexible coupling portion for coupling the input shaft main body to the boss, and the input shaft bearing is arranged between the casing and the input shaft main body.

In the planetary roller reducer of the present invention, the input shaft may constitute a bellows-type shaft joint, a leaf spring-type shaft joint or a metal slit-type shaft joint.

In the planetary roller reducer of the present invention, a joint element necessary for coupling an input shaft of a machine to be driven via the reducer may be installed on the carrier.

In the planetary roller reducer of the present invention, a carrier bearing for supporting the carrier so as to rotate with respect to the casing may be set between the casing and the carrier. In addition, the carrier bearing is preferably a cross roller bearing.

The planetary roller reducer of the present invention, which is directly coupled to a motor, may be provided with shaft portions installed on the carrier in the same number as the planetary rollers, a planetary roller bearing installed between the shaft portion and the planetary roller to support the planetary roller so as to rotate, and an inner ring retaining member installed on the shaft portion to fix the shaft portion so that an inner ring of the planetary roller bearing will not deviate to a length direction of the shaft portion with respect to the shaft portion. The planetary roller reducer of the present invention, which is directly coupled to a motor, may also be provided with an outer ring retaining member installed on the planetary roller to fix an outer ring of the planetary roller bearing so that the planetary roller will not deviate to a length direction of the shaft portion.

The planetary roller reducer of the present invention, which is directly coupled to a motor, may be provided with a sun shaft bearing installed between the leading end of the sun shaft and the carrier to support the leading end of the sun shaft so as to rotate with respect to the carrier, and a second elastic member installed between the carrier and the sun shaft bearing or between the sun shaft bearing and the sun shaft to support elastically the sun shaft.

Advantageous Effects of the Invention

According to the planetary roller reducer of the present invention, a first elastic member for supporting elastically the input shaft is installed between the input shaft bearing and the input shaft or between the casing and the input shaft bearing. Therefore, even when gyrating motions are found on the input shaft or the sun shaft, a core deflection developed on the input shaft resulting from the gyrating motions is absorbed by the first elastic member which undergoes an elastic deformation. Thereby, no excessive moment load acts on the input shaft bearing for supporting the input shaft, the output shaft of the motor directly coupled to the input shaft or the front bearing of the motor for supporting the output shaft. In other words, no excessive force for reducing the gyrating motions of the sun shaft and the input shaft will act on the input shaft bearing or the output shaft of the motor. Further, no excessive force for complementarily reducing the gyrating motions resulting from the input shaft ball bearing will act on the front bearing of the motor. As a result, the input shaft bearing, the output shaft of the motor, or the front shaft of the motor is prevented from being damaged, by which the reducer is improved in reliability.

Further, according to the planetary roller reducer of the present invention, a deflection of the input shaft is absorbed by the first elastic member. Therefore, when the output shaft of the motor is positioned to the input shaft less strictly, gyrating motions of the input shaft are suppressed. Consequently, the positioning can be made only by keeping an assembly allowance at a generally accepted level, attaining an improved workability in assembling the reducer.

According to the planetary roller reducer of the present invention, the input shaft is provided with an input shaft main body to which the sun shaft is coupled, a boss coupled to the output shaft of the motor, and a flexible coupling portion for coupling the input shaft main body to the boss. Therefore, even when gyrating motions are found on the input shaft and the sun shaft, a core deflection developed on the input shaft resulting from the gyrating motions is absorbed by the coupling portion which undergoes bending. Thereby, no excessive moment load will act on the input shaft bearing for supporting the input shaft, the output shaft of the motor directly coupled to the input shaft or the front bearing of the motor for supporting the output shaft. As a result, the reducer is improved in reliability.

According to the planetary roller reducer of the present invention, the input shaft bearing is arranged between the input shaft main body portion of the flexible input shaft and the casing. It is, therefore, possible to support the sun shaft even if no component for supporting the sun shaft is installed on a component different from the input shaft. Thereby, the reducer can be decreased in size. Further, a joint element necessary for coupling the input shaft of a machine to be driven via the reducer is installed on the carrier. Therefore, the reducer can be directly coupled to the machine without providing separately a joint between the reducer and the machine to be driven. Thereby, it is possible to miniaturize a transmission system including the machine to be driven and also decrease the weight as a whole. Further, power can be transmitted smoothly from the reducer to the machine to be driven without loss of power.

According to the planetary roller reducer of the present invention, since the inner ring retaining member of the planetary roller bearing is installed on the shaft portion of the carrier, the planetary roller including the planetary roller bearing is retained at a predetermined position so as not to deviate in the length direction of the shaft portion with respect to the shaft portion. Further, since the outer ring retaining member of the planetary roller bearing is installed on the planetary roller, the planetary roller is retained at a predetermined position so as not to deviate in the length direction of the shaft portion with respect to the planetary roller bearing. Thereby, the planetary roller is prevented from a side slip. It is possible to reduce a frictional force developed between the planetary roller and another rotating element, loss of power resulting from a difference in relative speed between them and subtle friction.

According to the planetary roller reducer of the present invention, the second elastic member for supporting elastically the sun shaft is installed between the carrier and the sun shaft bearing or between the sun shaft bearing and the sun shaft. Therefore, even when gyrating motions are found on the input shaft and the sun shaft, a core deflection developed on the sun shaft resulting from the gyrating motions is absorbed by the second elastic member which undergoes an elastic deformation. Thereby, no excessive moment load will ant on the sun shaft hearing for supporting the sun shaft. In other words, no excessive force for reducing the gyrating motions of the sun shaft will act on the sun shaft bearing. As a result, the sun shaft bearing is prevented from being damaged, therefore, the reducer is improved in reliability.

DESCRIPTION OF THE REFERENCE SYMBOLS

Figure 1:
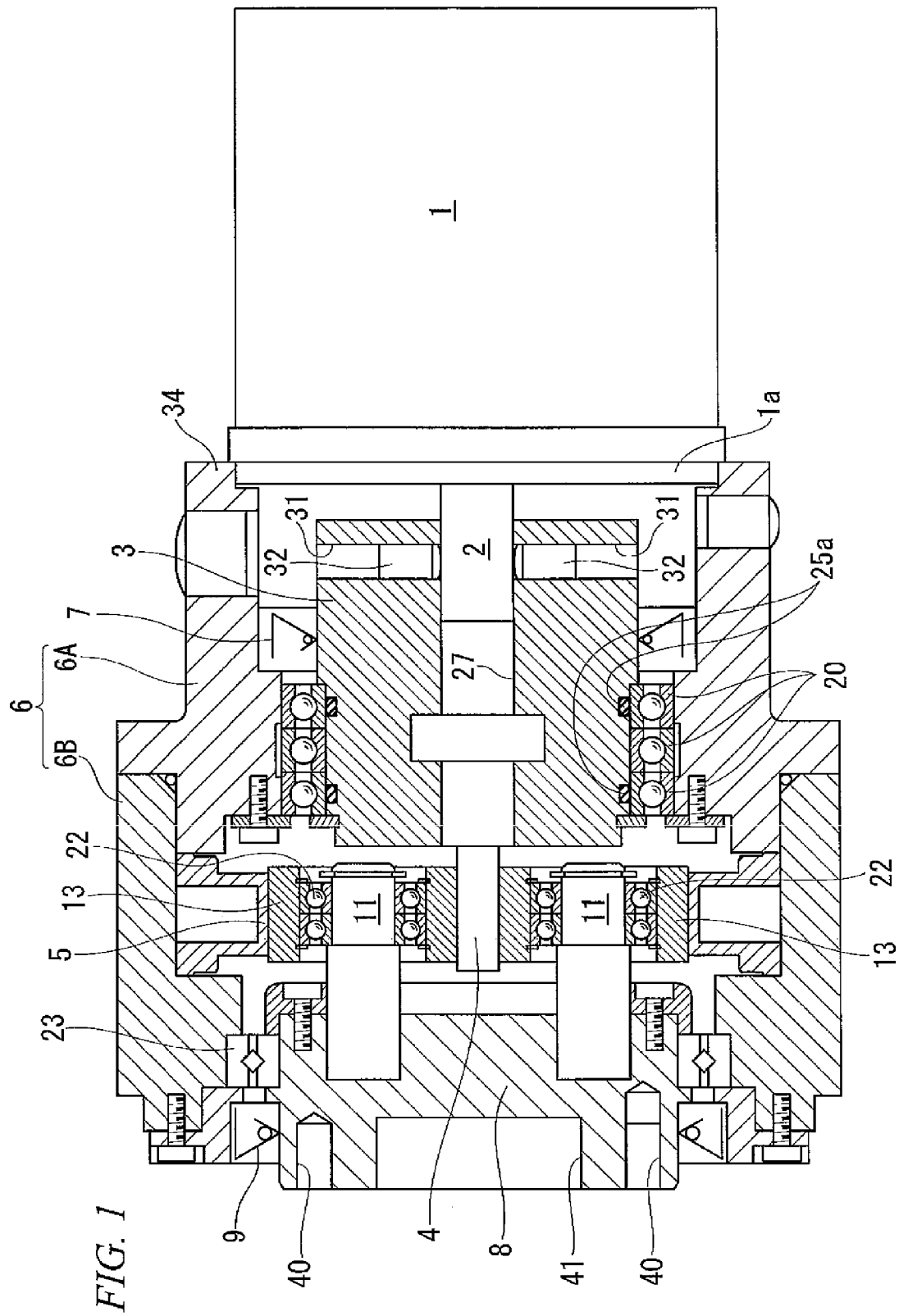
FIG. 1 is a cross sectional view showing Embodiment 1 of the planetary roller reducer of the present invention.

1: motor
1a: socket portion
2: output shaft
3: input shaft
4: sun shaft
5: elastic ring
6: casing
8: carrier
11: pin shaft (shaft portion)
13: planetary roller
20: input-side ball bearing (input shaft bearing)
22: planetary roller bearing
23: output-side bearing (carrier bearing)
25a, 25b: elastic body (first elastic member)
27: fitting hole
30: positioning mechanism
34: flange
36: retaining ring (outer ring retaining member)
38: retaining ring (inner ring retaining member)
40: bolt-use thread hole
41: fitting hole for
45: input shaft
46: input shaft main body
47: boss
48: bellows portion (coupling portion)
49: fitting hole
55: input shaft 56: input shaft main body
57: boss
58: joint portion (coupling portion)
61: inner ball bearing (sun shaft bearing)
25b: elastic body (second elastic member)

DETAILED DESCRIPTION OF THE INVENTION

Embodiment 1

An explanation will be made for Embodiment 1 of the planetary roller reducer of the present invention by referring to FIG. 1 to FIG. 6.

As shown in FIG. 1, the planetary roller reducer of the present embodiment is a reducer directly coupled to an output shaft 2 of a motor 1, which is provided with a casing 6, an input shaft 3, an input-side oil seal 7, an input-side ball bearing (input shaft bearing) 20, a sun shaft 4, a carrier 8, an output-side oil seal 9, an output-side bearing (carrier bearing) 23, a plurality of planetary rollers 13 and an elastic ring 5.

The casing 6 is made up of an input-side casing 6A for accommodating the input shaft 3 and an output-side casing 6B for accommodating the planetary rollers 13 and the carrier 8. The input shaft 3 is accommodated in the input-side casing 6A, one end of which is directly coupled to the output shaft 2 of the motor 1 and the other end of which is provided with the sun shaft 4 (a structure for coupling the output shaft 2 to the input shaft 3 will be described later). The input-side oil seal 7 is installed between the input-side casing 6A and the input shaft 3 so as not to inhibit the rotation of the input shaft 3 and also so as to prevent oil from flowing out of the casing 6. Three input-side ball bearings 20 are set between the input-side casing 6A and the input shaft 3, supporting the input shaft 3 so as to move rotationally with respect to the input-side casing 6A. The sun shaft 4 is installed at the other end of the input shaft 3 in such a manner that the central axis thereof is in agreement with the input shaft 3.

The carrier 8 constitutes an output shaft joint of the reducer. The carrier 8 is formed in a disk shape and accommodated in the output-side casing 6B. The output-side oil seal 9 is installed between the output-side casing 6B and the carrier 8 so as not to inhibit the rotation of the carrier 8 and also so as to prevent oil from flowing out of the casing 6. The output-side bearing 23 is set between the output-side casing 6B and the carrier 8, supporting the carrier 8 so as to move rotationally with respect to the output-side casing 6B. A cross roller bearing for handling a moment force as well is adopted as the output-side bearing 23 of the present embodiment. A plurality of planetary rollers 13 are supported on the carrier 8 so as to rotate and installed so as to be in external contact with the sun shaft 4. More specifically, they are supported by pin shafts (shaft portions) 11 provided in the same number as the planetary rollers 13 installed upright on the carrier 8 via planetary roller bearings 22. The rotating shaft of each of the planetary rollers 13 is parallel with the central axis of the input shaft 3 and that of the sun shaft 4. The elastic ring 5 is accommodated in the output-side casing 6B, fixed at a predetermined position and elastically in internal contact with a plurality of the planetary rollers 13. The central axis of the elastic ring 5 is in agreement with the central axis of the input shaft 3 and that of the sun shaft 4.

Figure 2:
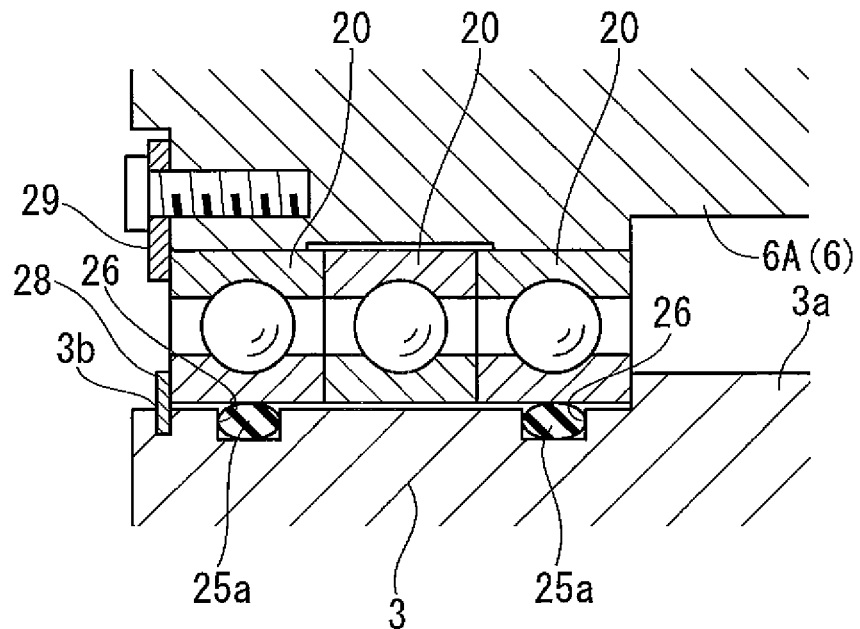
FIG. 2 is a drawing showing Embodiment 1 of the planetary roller reducer of the present invention, and that is a cross sectional view showing a structure for supporting an input shaft via an elastic body.

An elastic body (first elastic member) 25a for elastically supporting the input shaft 3 with respect to the input-side ball bearing 20 is installed between the input shaft 3 and the input-side ball bearing 20. The outer diameter of the input shaft 3 is smaller than the inner diameter of the input-side ball bearing 20, and a slight clearance, which is approximately a few hundredths of a millimeter, is provided between the input shaft 3 and the input-side ball bearing 20. The elastic body 25a is installed so as to fill the clearance. More specifically, an O-ring, which is used for an oil seal, for example, is adopted as the elastic body 25a of the present embodiment. As shown in FIG. 2, an endless groove 26 is formed on the outer circumferential surface of the input shaft 3, and the elastic body 25a is attached to the input shaft 3 so as to be fitted into the groove 26. Then, the input shaft 3 is inserted into the input-side ball bearing 20 so as to hold the elastic body 25a between the input-side ball bearing 20 and the input shaft 3. The elastic body 25a is held between the input shaft 3 and the input-side ball bearing 20 to undergo an elastic deformation. Then, the elastic body 25a is firmly attached to them. A diameter expanding portion 3a, which is larger in diameter than a part to which the input-side ball bearing is attached, is formed on the input side of the input shaft 3. An endless groove 3b parallel with the groove 26 is formed on the output side of the input shaft 3. Three input-side ball bearings 20 attached to the input shaft 3 are held between a step of the diameter expanding portion 3a and a retaining ring 28 fitted into the groove 3b, thereby retained at a predetermined position so as not to deviate in an axial direction with respect to the input shaft 3. The input shaft 3 to which the input-side ball bearing 20 is attached is inserted into the casing 6 along the axial direction and regulated by a stopper 29 fixed inside the casing 6 with screws so as to restrict movement to one of the axial directions.

Figure 3:
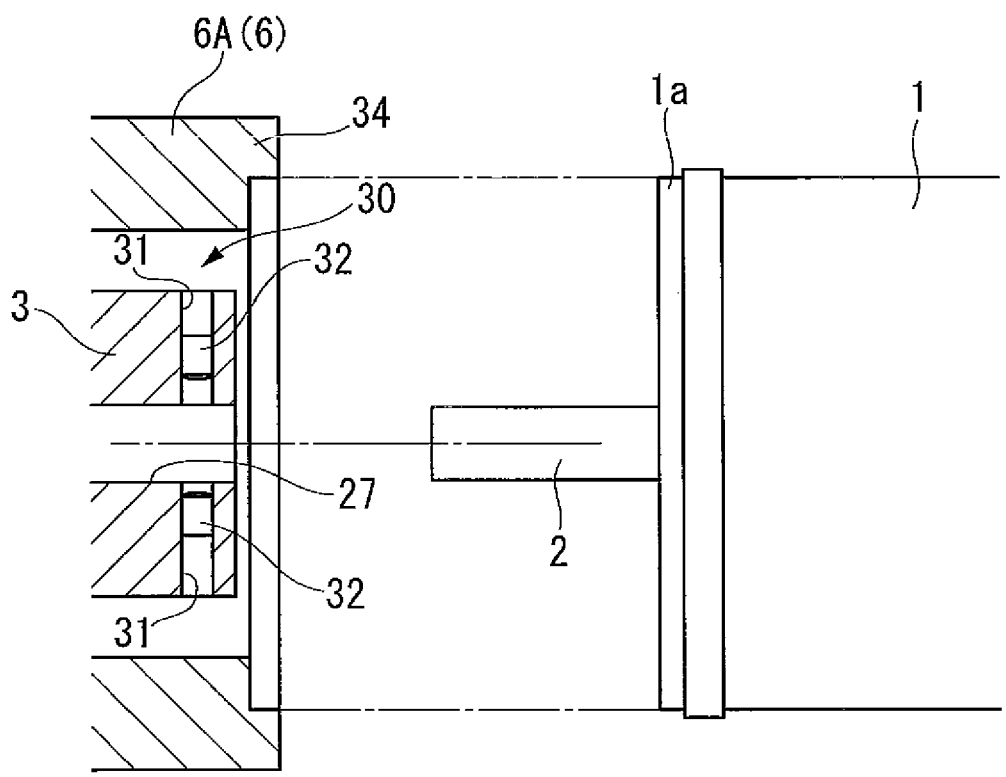
FIG. 3 is a drawing showing Embodiment 1 of the planetary roller reducer of the present invention, and that is a cross sectional view showing the relationship between the reducer and a motor.

As shown in FIG. 3, a fitting hole 27 for fitting the output shaft 2 of the motor 1 is formed at one end of the input shaft 3. The inner diameter of the fitting hole 27 is larger than the outer diameter of the output shaft 2, and a slight clearance is formed between an outer circumferential surface of the output shaft 2 fitted into the fitting hole 27 and an inner circumferential surface of the fitting hole 27. When the size of the clearance and the outer diameter of the output shaft 2 are respectively denoted as G1 and D1, a ratio of G1 to D1, (that is, a value of G1/D1), is set so as to fall into a range of 0.005% or more to 1.0% or less.

A positioning mechanism 30 for adjusting a relative position of the output shaft 2 fitted into the fitting hole 27 with respect to the input shaft 3 is installed at one end of the input shaft 3. The positioning mechanism 30 is made up of a plurality of female thread holes 31 formed radially on the input shaft 3 and a plurality of locking screws 32 to be fitted into each of the female thread holes 31. The female thread holes 31 are individually formed in a radial direction of the input shaft 3 from the outer circumferential surface of the input shaft 3 up to the inner circumferential surface of the fitting hole 27. These female thread holes 31 are individually arranged at equal intervals along a circumferential direction of the input shaft 3. The locking screw 31 is screwed from the outer circumferential surface of the input shaft 3 until the leading end thereof is butted against the output shaft 2 fitted into the fitting hole 27.

In order to adjust a relative position of the output shaft 2 with respect to the input shaft 3, first, the output shaft 2 is inserted into the fitting hole 27 in a state that each of the locking screws 32 is loosened. Then, a fastener is inserted into the casing 6 through a fastening hole formed on the input-side casing 6A, and each of the locking screws 32 is loosely fastened to temporarily fix the output shaft 2. Further, a measuring instrument (for example, a distance meter) for measuring a displacement of the output shaft 2 is installed through a measuring hole formed on the input-side casing 6A. Then, while the output shaft 2 is rotated together with the input shaft 3, each of the locking screws 32 is adjusted for a screwed amount so that the output shaft 2 can be displaced to a smaller extent, so that the output shaft 2 can be constantly rotated at a predetermined position, thereby determining a relative position of the output shaft 2 with respect to the input shaft 3. In addition, the fastening hole and the measuring hole are closed after being used.

A flange 34 for fixing the motor 1 to the input-side casing 6A is formed on the input-side casing 6A in such a manner that the socket portion 1a of the motor 1 is fitted inside. Both the flange 34 and the socket portion 1a are formed in a circular shape, and the inner diameter of the flange 34 is larger than the outer diameter of the socket portion 1a. A slight clearance is formed between the socket portion 1a fitted into the flange 34 and the flange 34. Where the size of the clearance and the outer diameter of the socket portion 1a are respectively denoted as G2 and D2, a ratio of G2 to D2, (that is, a value of G2/D2), is set so as to fall into a range of 0.050% or more to 2.50% or less.

In order to fix the motor 1 to the casing 6, the motor 1 is temporarily fixed to the input-side casing 6A with screws (not illustrated) to determine a relative position of the output shaft 2 with respect to the input shaft 3, as described above. Thereafter, while care is taken so as not to influence the positional relationship between the output shaft 2 and the input shaft 3, the screws are tightened to fix the motor 1 to the input-side casing 6A.

Figure 4:
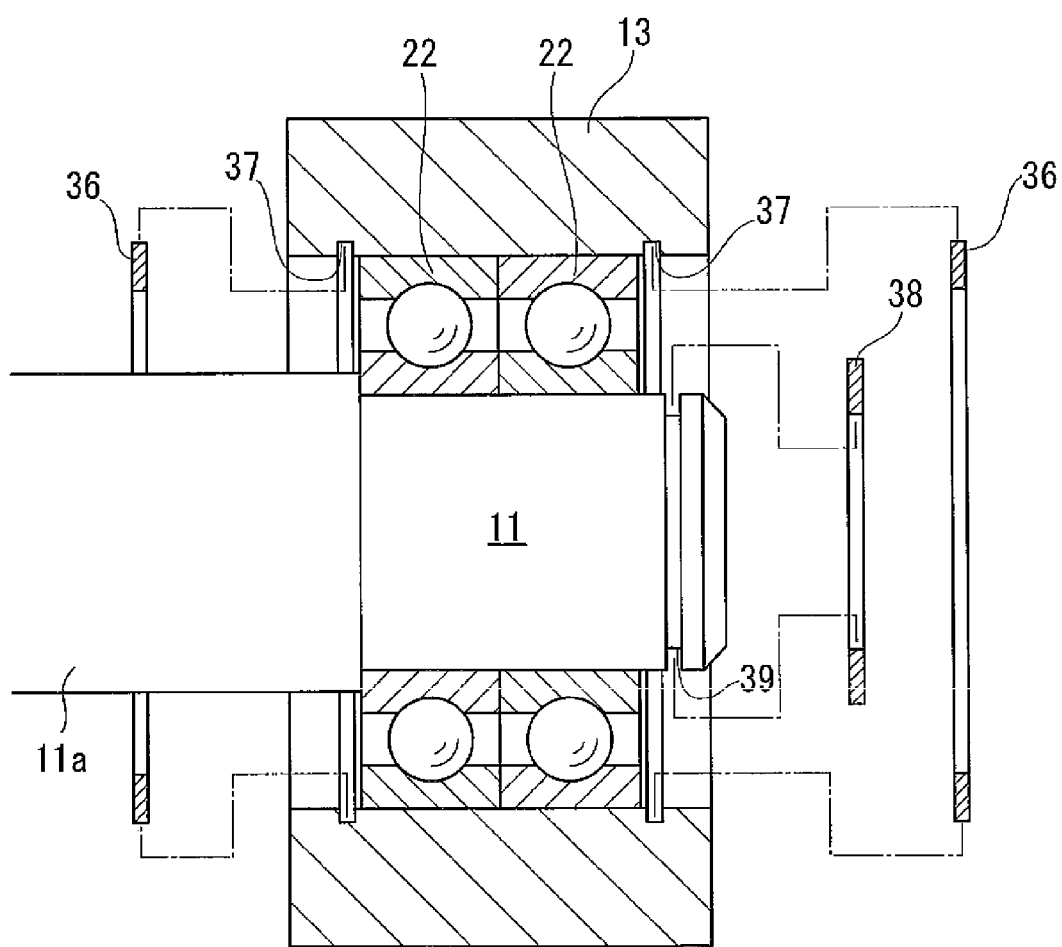
FIG. 4 is a drawing showing Embodiment 1 of the planetary roller reducer of the present invention, and that is a cross sectional view showing a structure for supporting a planetary roller.

As shown in FIG. 4, a retaining ring (an outer-ring retaining member) 36 is installed at both ends of each of the planetary rollers 13. An outer ring of the planetary roller bearing 22 is held between both the retaining rings 36, thereby retained at a predetermined position in such a manner that the planetary rollers 13 are not deviated in a length direction of the pin shaft 11 with respect to the planetary roller bearing 22. More specifically, an endless groove 37 is formed on the inner circumferential surface of the planetary roller 13, and the retaining ring 36 is fitted into the groove 37 in an attaching manner by utilizing its own elasticity. In other words, the outer diameter of the retaining ring 36 is substantially equal to the diameter of the groove 37. The retaining ring 36 is fitted into the groove 37, by which the retaining ring 36 is confined inside the groove 37. In addition, a spacer may be interposed between the outer ring of the planetary roller bearing 22 and the retaining ring 36, whenever necessary.

In addition, a retaining ring (an inner-ring retaining member) 38 is installed on one side of the planetary roller 13 on each of the pin shafts 11. Further, a diameter expanding portion 11a larger in diameter than a part fitted into the planetary roller bearing 22 is formed on each of the pin shafts 11. The diameter expanding portion 11a is installed on the opposite side of the retaining ring 38. The inner ring of the planetary roller bearing 22 is held between the retaining ring 38 and a step of the diameter expanding portion 11a by which the planetary roller bearing 22 is retained at a predetermined position so as not to deviate in the length direction of the pin shaft 11 with respect to the pin shaft 11. More specifically, an endless groove 39 is formed on the outer circumferential surface of the pin shaft 11, and a retaining ring 38 is fitted into the groove 39 by utilizing its own elasticity. In other words, the inner diameter of the retaining ring 38 is substantially equal to the diameter of the groove 39. The retaining ring 38 is fitted into the groove 39, by which the retaining ring 38 is confined inside the groove 39. In addition, a spacer may be interposed between the inner ring of the planetary roller bearing 22 and the retaining ring 38, whenever necessary.

The planetary roller reducer of the present embodiment is free of a so-called output shaft and provided with a carrier 8 constituting a part of a shaft joint in place of the output shaft.

The carrier 8 is supported by a moment-resistant bearing (for example, a cross roller bearing) 23 installed firmly between the outer circumference thereof and the inner circumference of the casing 6 so as to rattle or deflect to a smaller extent and rotate at high accuracy. In FIG. 1, the carrier 8 carries and supports the pin shaft 11 to rotate at a revolving speed. A plurality of bolt-use thread holes 40 and an alignment fitting hole 41 are installed on the outer edge surface of the carrier 8 as joint elements necessary for coupling the input shaft (not illustrated) of a machine to be driven via the reducer. Each joint element is formed in advance in alignment with a shape of the input shaft of the machine to be driven so that the carrier 8 constitutes an output shaft joint of the reducer.

In the above-constituted planetary roller reducer, rotating power transmitted from the output shaft 2 of the motor 1 to the input shaft 3 and the sun shaft 4 via the locking screw 32 drives a plurality of planetary rollers 13 in external contact with the sun shaft 4 and also in internal contact with the elastic ring 5 fixed to the casing 6. Thereby, the planetary rollers 13 revolve around the sun shaft 4. The revolving movement of the planetary rollers 13 is transmitted to the pin shaft 11 via the planetary roller bearing 22. Thereby, the carrier 8 at which the pin shaft 11 is installed upright rotates at a revolving speed of the planetary rollers 13. The carrier 8 constitutes a disk having a joint element and a cross roller bearing for handling a moment force as well is adopted as the output-side bearing 23 between the carrier 8 and the casing 6. The casing 6 is fixed to a machine (not illustrated) to be driven via the reducer, by which the motor 1 is also fixed to the machine via the casing 6. Thereby, the carrier 8 constitutes an output shaft joint which rotates at a revolving speed of the planetary rollers 13.

A core deflection developed on the sun shaft 4 induces subtle gyrating motions of the input shaft 3 integrally formed with the sun shaft 4. There is also developed a core deflection resulting from a fitting allowance of the socket portion 1a of the motor 1 with respect to the flange 34 or a fitting allowance of the output shaft 2 of the motor 1 with respect to the fitting hole 27 of the input shaft 3, thereby increasing the above-described gyrating motions. The above-described gyrating motions are reduced by the input-side ball bearing 20 which corrects a core deflection of the input shaft 3. However, when the core deflection of the input shaft 3 is corrected, an excessive force acts on the input-side ball bearing 20, resulting in the possibility that the input-side ball bearing 20 may be damaged. Further, where the gyrating motions are reduced to a smaller extent, an excessive force acts on the front bearing (not illustrated) of the motor 101, resulting in the possibility that the front bearing thereof may be damaged.

Therefore, in the present embodiment, the input shaft 3 is loosely fitted into the inner ring of the input-side ball bearing 20 having a clearance of about a few hundredths of a millimeter, and an elastic body 25a is then interposed at the clearance between the input-side ball bearing 20 and the input shaft 3 to support elastically the input shaft 3. Therefore, the elastic body 25a elastically absorbs a core deflection of the sun shaft 4 and the input shaft 3. Thus, there is no excessive force acting on the sun shaft 4 and the input-side ball bearing 20 or the front bearing of the motor 101. Further, the output shaft 2 of the motor 1 is loosely fitted into the fitting hole 27 of the input shaft 3 at a similar clearance as described above. Then, the locking screw 32 is used only to stop the rotation thereof, by which the deflection can be released through the clearance, and there is no excessive bending stress acting on the input shaft 3.

In order for the motor 1 to be aligned with the planetary roller reducer and coupled thereto, it would be ideal that a circular flange 34 and a circular socket portion 1a were installed respectively on the input-side casing 6A and on the front surface of the motor 1 and fastened by using a bolt, thereby aligning the output shaft 2 of the motor 1 with the input shaft 3. However, since there is a fear that the above-described core deflection may be found on the sun shaft 4, a fitting allowance between the flange 34 and the socket portion 1a is set so as to give a clearance of a few hundredths of a millimeter between them. Thereby, the motor 1 can be adjusted for the alignment so as to cope with a core deflection of the sun shaft 4, that is, the input shaft 3.

According to the planetary roller reducer of the present embodiment, the elastic body 25a is installed between the input shaft 3 and the input-side ball bearing 20. Therefore, even when gyrating motions are found on the sun shaft 4 and the input shaft 3 integrally formed with the sun shaft 4, a core deflection developed on the input shaft 3 resulting from the gyrating motions is absorbed by the elastic body 25a which undergoes an elastic deformation. Thereby, there is no excessive moment load acting on the input-side ball bearing 20 for supporting the input shaft 3, the output shaft 2 of the motor 1 directly coupled to the input shaft 3 or the front bearing (not illustrated) of the motor 1 for supporting the output shaft 2. As a result, the reducer is improved in reliability.

According to the planetary roller reducer of the present embodiment, a deflection of the input shaft 3 can be absorbed by the elastic body 25a. Therefore, even when the output shaft 2 of the motor 1 is positioned to the input shaft 3 less strictly, gyrating motions of the input shaft 3 are suppressed. Components may be assembled, with an assembly allowance set at a generally accepted level, attaining an improved workability in assembling the reducer.

According to the planetary roller reducer of the present embodiment, the positioning mechanism 30 for adjusting a relative position of the output shaft 2 of the motor 1 with respect to the input shaft 3 is installed on the input shaft 3. Therefore, the output shaft 2 of the motor 1 can be positioned to the input shaft 3 accurately in the course of assembling the reducer. In addition, a ratio of G1 (the size of a clearance between the outer circumferential surface of the output shaft 2 and the inner circumferential surface of the fitting hole 27) to D1 (the outer diameter of the output shaft 2), denoted (G1/D1), is preferably from 0.005% or more to 1.0% or less. Where a value of G1/D1 is less than 0.005%, there is a narrow region adjustable in positioning the output shaft 2 of the motor 1 to the input shaft 3, resulting in a possibility that the output shaft 2 may not be accurately positioned to the input shaft 3. On the other hand, where a value of G1/D1 is greater than 1.0%, the output shaft 2 of the motor 1 is in contact with the input shaft 3 at a smaller area, thus resulting in a possibility that force may be transmitted with loss from the output shaft 2 to the input shaft 3. Where a value of G1/D1 is set in the above-described range, the output shaft 2 of the motor 1 can be easily positioned to the input shaft 3, and the power of the motor 1 can be transmitted without loss from the output shaft 2 to the input shaft 3.

According to the planetary roller reducer of the present embodiment, the flange 34 is installed on the casing 6. Therefore, the socket portion 1a of the motor 1 is fitted into the flange 34, thereby making it possible to position accurately the motor 1 to the casing 6. In addition, a ratio of G2 (the size of a clearance between the inside surface of the flange 34 and the outside surface of the socket portion 1a) to D2 (the outer diameter of the socket portion 1a), denoted (G2/D2), is preferably from 0.05% or more to 2.50% or less. Where a value of G2/D2 is less than 0.05%, there is a narrow region adjustable in positioning the socket portion 1a of the motor 1 to the casing 6. Therefore, even when the output shaft 2 of the motor 1 is accurately positioned to the input shaft 3, the socket portion 1a of the motor 1 may interfere with the flange 34, which may consequently contribute to an inhibited rotation of the input shaft 3. On the other hand, where a value of G2/D2 is in excess of 2.50%, there is an excessively wide region adjustable in positioning the socket portion 1a of the motor 1 to the casing 6, thus resulting in a possibility that the motor 1 may not be accurately positioned in the casing 6. Where a value of G2/D2 is set in the above range, the motor 1 can be easily positioned in the casing 6.

According to the planetary roller reducer of the present embodiment, a joint element necessary for coupling the input shaft of a machine to be driven via the reducer is installed on the carrier 8. Therefore, even when no joint is installed separately between the reducer and the machine to be driven, the reducer can be directly coupled to the machine. Thereby, it is possible to miniaturize a transmission system including the machine to be driven and also reduce the weight of the system as a whole. Further, power can be transmitted from the reducer to the machine to be driven smoothly and without loss of power.

According to the planetary roller reducer of the present embodiment, the planetary roller 13 is fixed at a predetermined position by the retaining ring 36 installed at each of the planetary rollers 13 so as not to deviate in a length direction of the pin shaft 11 with respect to the planetary roller bearing 22. At the same time, the planetary roller 13 including the planetary roller bearing 22 is fixed at a predetermined position by the retaining ring 38 installed at the pin shaft 11 of the carrier 8 and the diameter expanding portion 11a installed on the pin shaft 11 so as not to deviate in a length direction of the pin shaft 11 with respect to the pin shaft 11. Thereby, since a side slip is prevented along the pin shaft 11 of the planetary roller 13, it is possible to reduce a frictional force developed between the planetary roller 13 and other rotating elements, loss of power resulting from a difference in relative speed between them and the development of subtle friction.

In the present embodiment, an elastic body 25a is installed between the input shaft 3 and the input-side ball bearing 20. However, an elastic body may be installed between the input-side casing 6A and the input-side ball bearing 20. In this instance, the inner diameter of the input-side casing 6A is greater than the outer diameter of the input-side ball bearing 20, and a slight clearance, which is approximately a few hundredths of a millimeter, is provided between them. The elastic body of the present embodiment is installed so as to fill the clearance.

Figure 5:
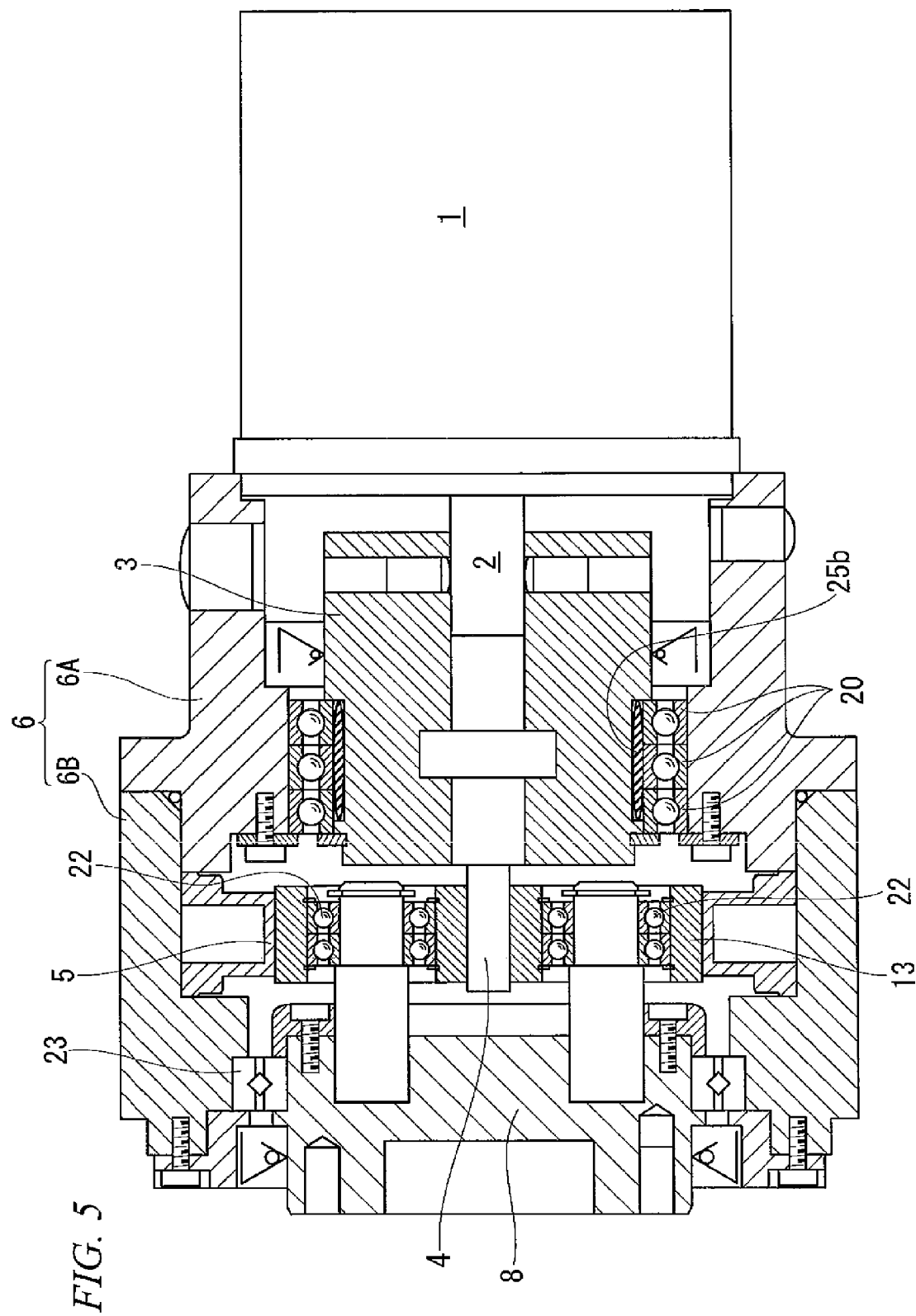
FIG. 5 is a cross sectional view showing an exemplified variation of Embodiment 1 of the planetary roller reducer of the present invention.

In the present embodiment, of three input-side ball bearings 20 installed between the input-side casing 6A and the input shaft 3, elastic bodies are individually installed at the bearings on both sides excluding that at the center. However, for example, as shown in FIG. 5, the elastic body 25b may be installed solely, which gives functions to all three input-side ball bearings 20.

Figure 6:
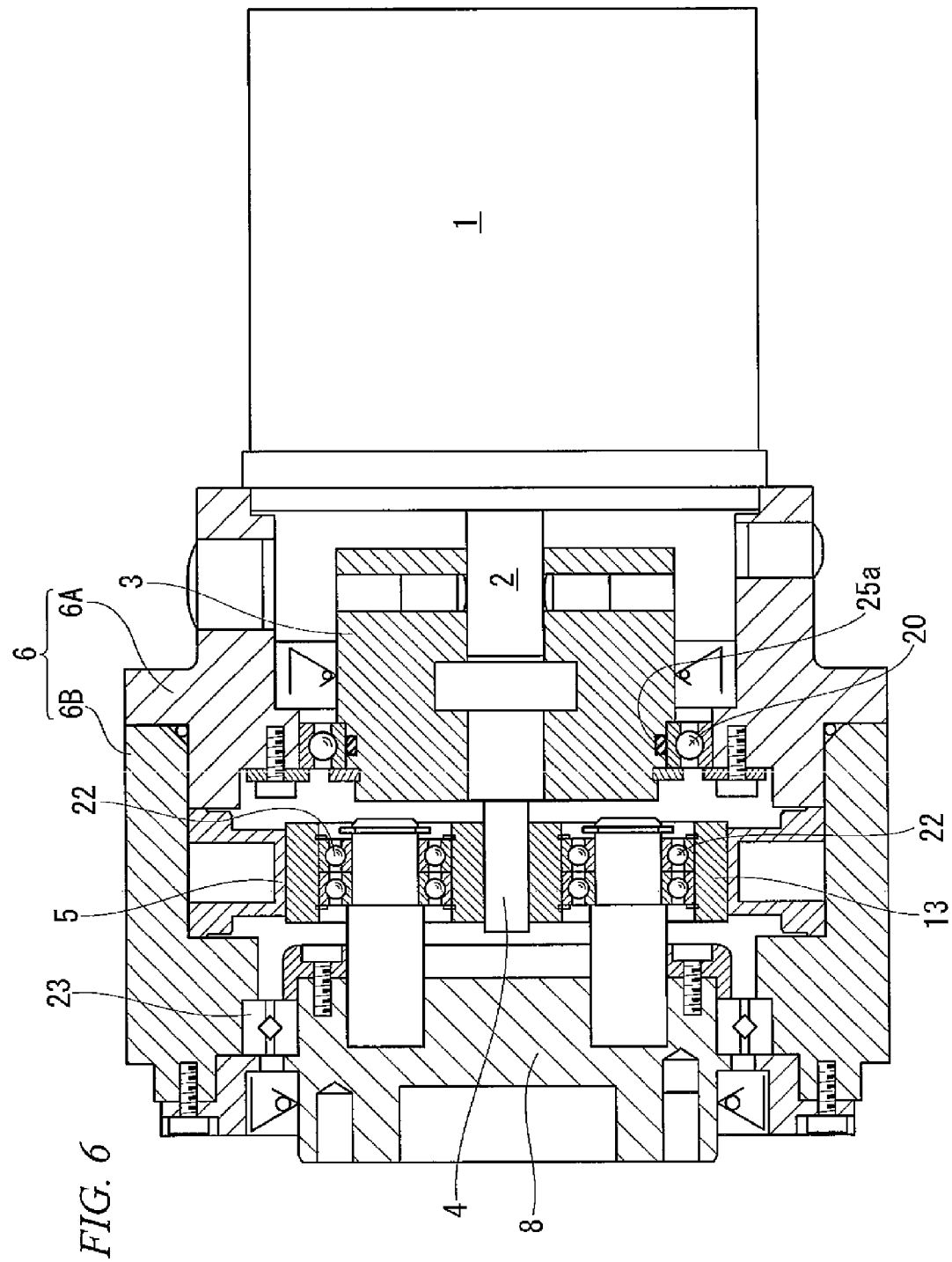
FIG. 6 is a cross sectional view showing another exemplified variation of Embodiment 1 of the planetary roller reducer of the present invention.

In the present embodiment, three input-side ball bearings 20 are arranged along an axial direction of the input shaft 3. However, there is no limitation on the number of the input-side ball bearings 20. For example, as shown in FIG. 6, the input-side ball bearing 20 may be installed solely between the input-side casing 6A and the input shaft 3.

In the present embodiment, an O-ring is adopted as the elastic body 25a. However, in place of the O-ring, another elastic member may be adopted. As an example, that in which a relatively soft metal such as copper or aluminum is formed into a coil shape, both ends of which are connected to give a ring shape.

In the present embodiment, the planetary roller 13 is fixed at a predetermined position by the retaining ring 36. However, the planetary roller 13 may be fitted into an outer ring of the planetary roller bearing 22 in a tightening manner so that both of them can be fixed.

Embodiment 2

An explanation will be made for Embodiment 2 of the planetary roller reducer of the present invention by referring to FIG. 7 and FIG. 8. In addition, constituents, which have already been explained in Embodiment 1, will be given the same reference numbers and the explanations of which will be omitted here.

Figure 7:
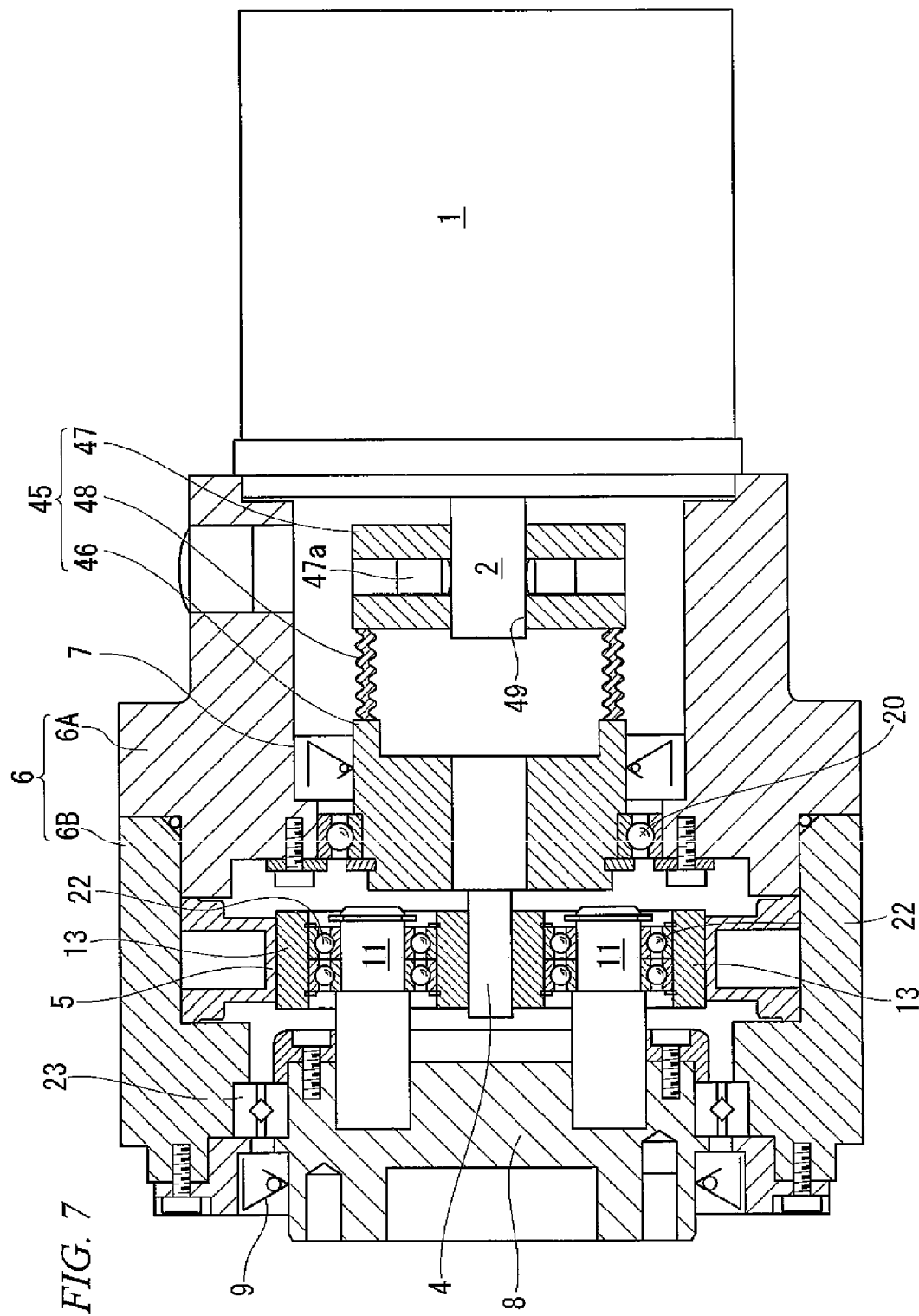
FIG. 7 is a cross sectional view showing Embodiment 2 of the planetary roller reducer of the present invention.
Figure 8:
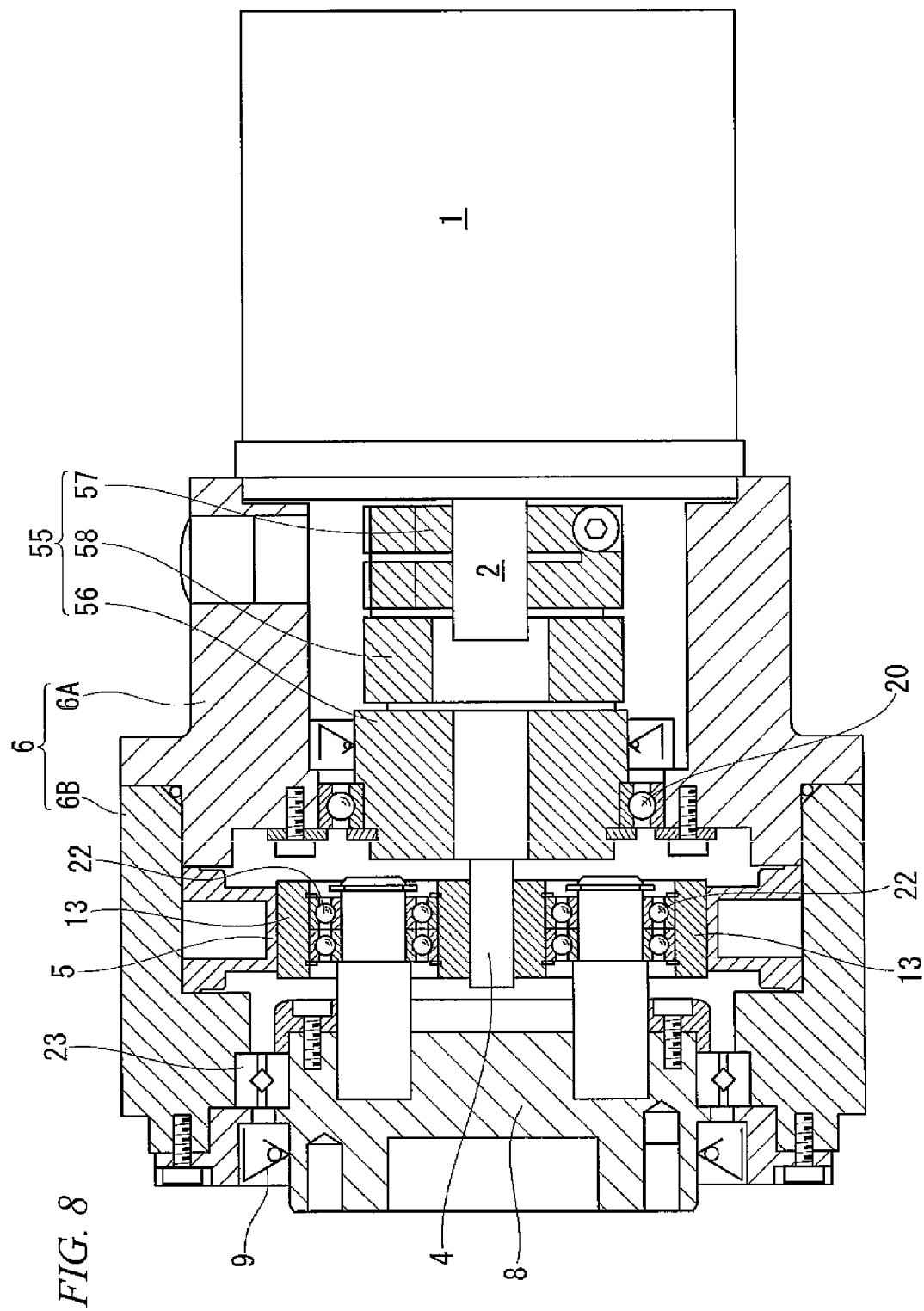
FIG. 8 is a cross sectional view showing an exemplified variation of Embodiment 2 of the planetary roller reducer of the present invention.

In the planetary roller reducer of the present embodiment, as shown in FIG. 7, the input shaft 45 is provided with an input shaft main body 46 to which the sun shaft 4 is fixed, a boss 47 coupled to the output shaft 24 of the motor 1, and a flexible metal-made bellows portion (coupling portion) 48 for coupling the input shaft main body 46 to the boss 47. In other words, the input shaft 45 constitutes a bellows-type shaft joint interposed between the output shaft 2 of the motor 1 and the sun shaft 4 to connect them.

In the present embodiment, only one input-side ball bearing 20 is installed. Further, no component corresponding to the elastic body of Embodiment 1 is set between the input shaft main body 45 and the input-side ball bearing 20, but the inner ring of the input-side ball bearing 20 is directly in contact with the input shaft main body 46.

A fitting hole 49 into which the output shaft 2 of the motor 1 is fitted is formed on the boss 47. The fitting hole 49 is machined with strict control given to the size of the inner diameter. Further, a fastening mechanism for fastening the output shaft 2 by using a locking screw 47a is installed on the boss 47. The motor 1 is coupled to the boss 47 by being accurately fitted into the fitting hole 49 of the output shaft 2 and by using the fastening mechanism to fasten the output shaft 2. In addition, mechanisms for fastening the output shaft 2 to the boss 47 may include a generally-used clamp-type fastening mechanism in place of the above-described fastening mechanism in which the locking screw 47a is used. Further, a key may be installed on the output shaft 2.

In the above-constituted planetary roller reducer, a core deflection developed on the sun shaft 4 will induce subtle gyrating motions of the input shaft 45 integrally made with sun shaft 4, with the input-side ball bearing 20 used as a supporting surface. Thus, in the present embodiment, since the input shaft 45 constitutes a bellows-type shaft joint, a core deflection developed on the sun shaft 4 and the input shaft 45 is absorbed by the bellows portion 48 which is bent, thereby no core deflection is transmitted to the boss 47. Therefore, no particular moment force is given to the boss 47 or no particular influence is given to the output shaft 2 of the motor 1, which is rigidly coupled to the boss 47.

According to the planetary roller reducer of the present embodiment, the input shaft 45 is provided with the input shaft main body 46, the boss 47 coupled to the output shaft 2 of the motor 1 and the flexible bellows portion 48. Therefore, even when gyrating motions are found on the sun shaft 4 and the input shaft main body 46, a core deflection developed on the input shaft 45 resulting from the gyrating motions is absorbed by the bellows portion 48 which is bent. Thereby, no excessive moment load will act on the output shaft 2 of the motor 1 directly coupled to the input shaft 45 or the front bearing of the motor 1 for supporting the output shaft 2. As a result, the reducer is improved in reliability.

In the present embodiment, the input shaft 45 constitutes the bellows-type shaft joint. However, the shaft joint is not limited in structure for the bellows type. For example, as shown in FIG. 8, the input shaft 55 may constitute a leaf spring-type shaft joint. More specifically, the input shaft 55 is provided with an input shaft main body 56 coupled to the sun shaft 4, a boss 57 coupled to the output shaft 2 of the motor 1, and a flexible leaf spring-type joint portion 58. The input shaft 55 has similar functions as the above-described bellows-type shaft joint, thereby absorbing a core deflection developed on the input shaft 55 resulting from gyrating motions of the sun shaft 4 and the input shaft main body 46. In addition to the leaf spring-type shaft joint, for example, the input shaft 55 may constitute a metal slit-type shaft joint.

Embodiment 3

An explanation will be made for Embodiment 3 of the planetary roller reducer of the present invention by referring to FIG. 9 and FIG. 10. In addition, constituents, which have already been explained in Embodiment 2, will be given the same reference numbers and the explanations of which will be omitted here.

Figure 9:
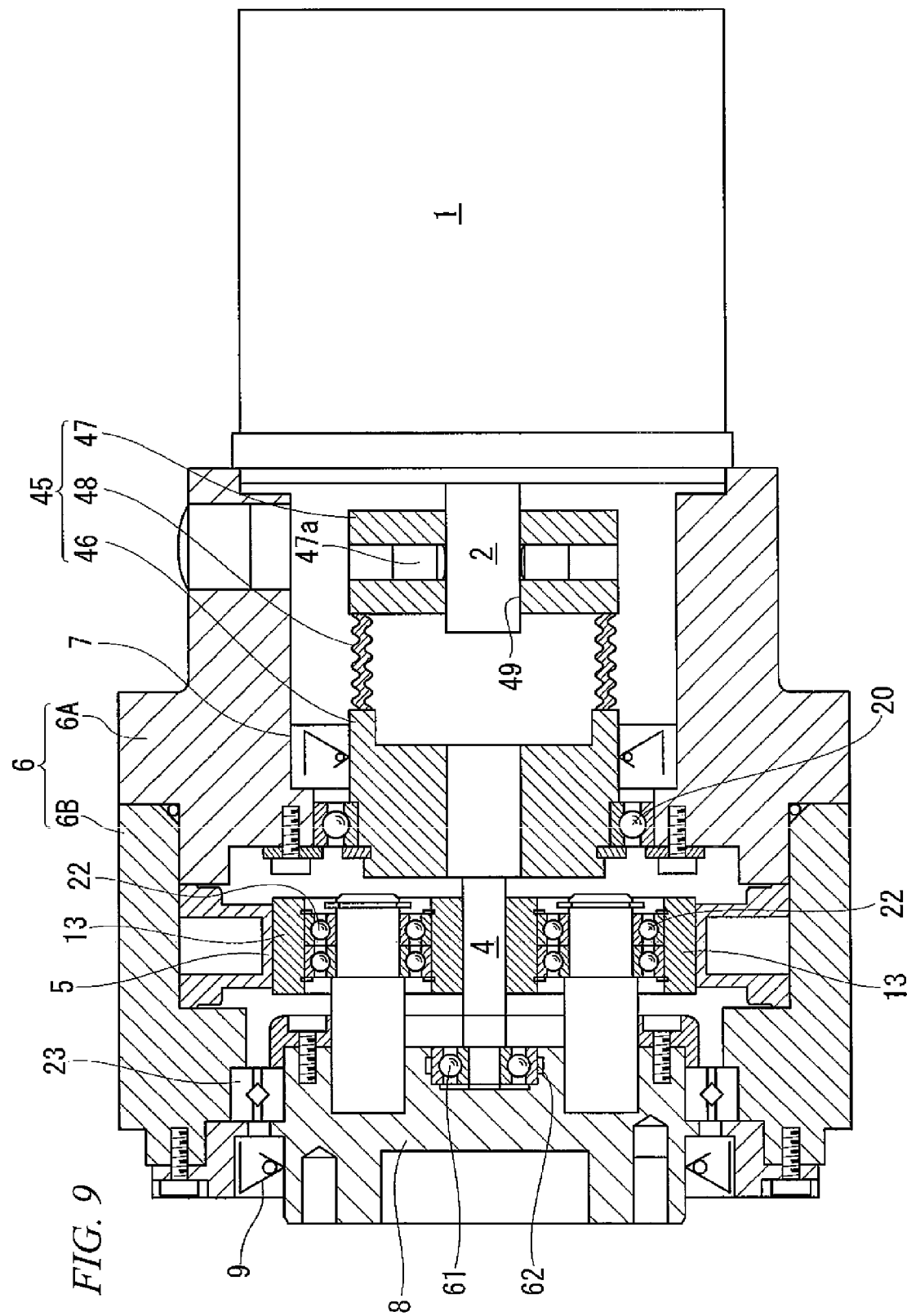
FIG. 9 is a cross sectional view showing Embodiment 3 of the planetary roller reducer of the present invention.
Figure 10:
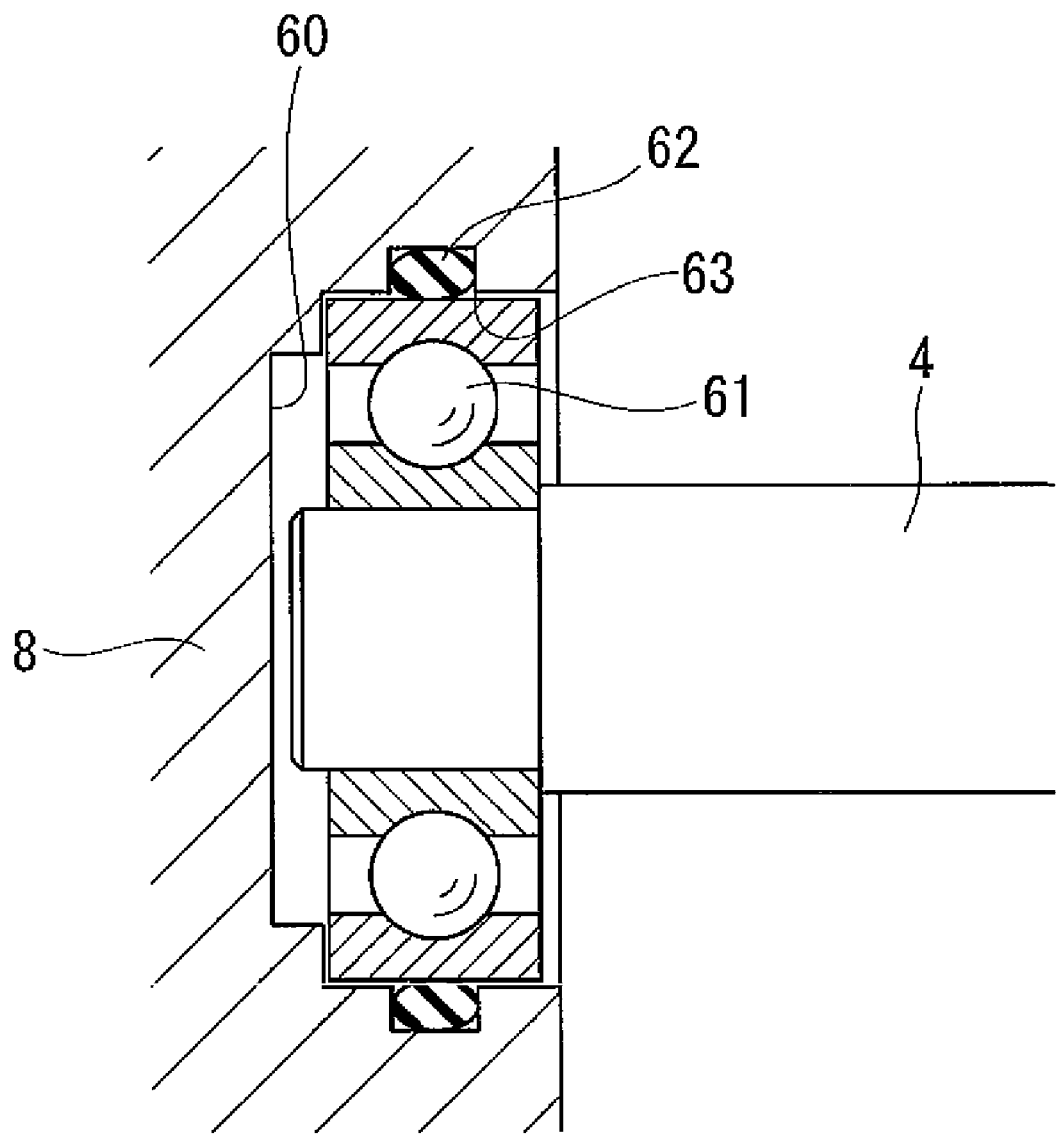
FIG. 10 is a drawing showing Embodiment 3 of the present invention, or a cross sectional view showing a structure for supporting a sun shaft.
Figure 11:
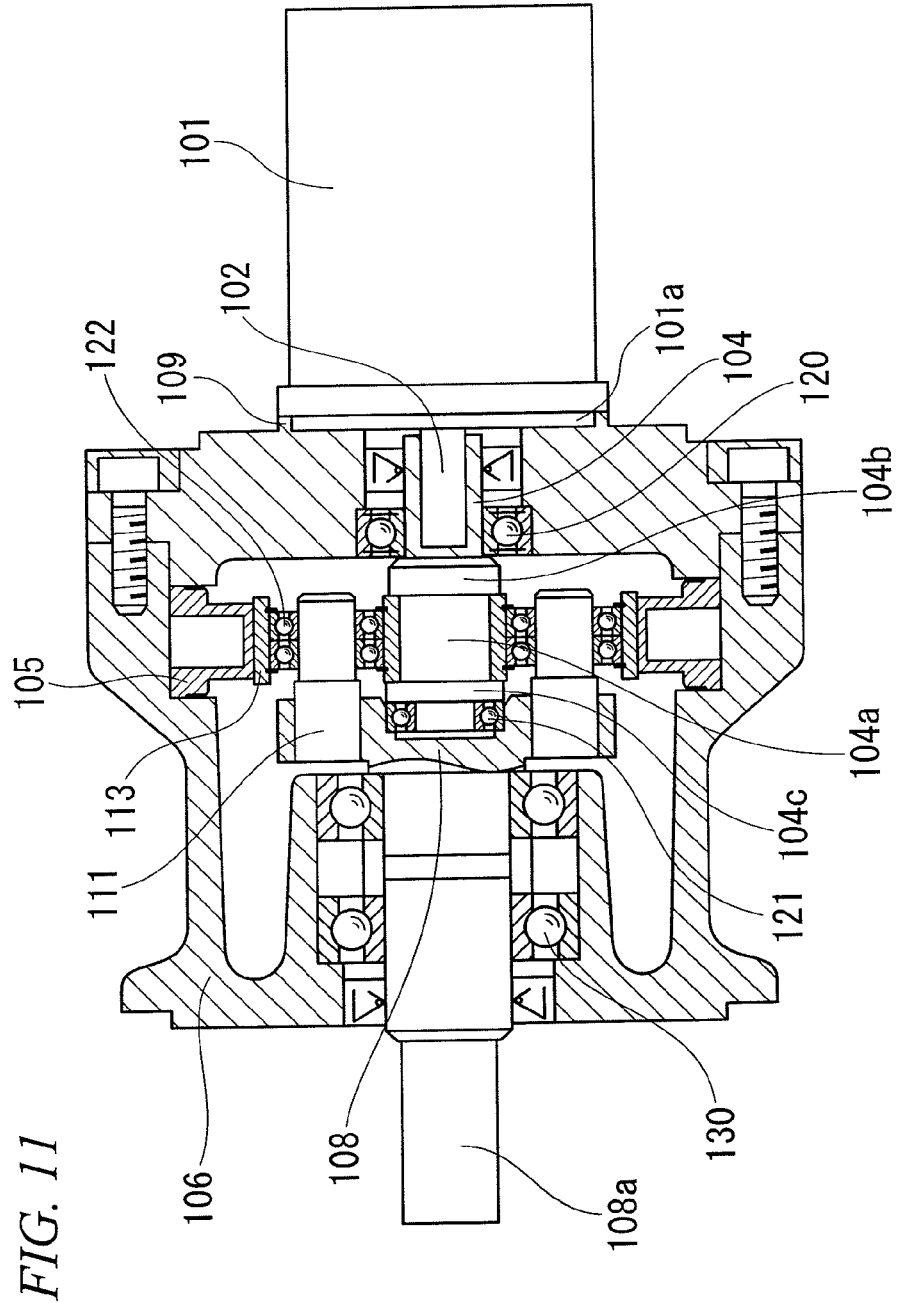
FIG. 11 is a cross sectional view showing a conventional planetary roller reducer.

In the planetary roller reducer of the present embodiment, as shown in FIG. 9, the leading end of the sun shaft 4 is supported on the carrier 8 so as to move rotationally. More specifically, as shown in FIG. 10, a circular hole 60 is formed at the center of the edge surface inside the carrier 8, and an inner ball bearing (a sun shaft bearing) 61 is fitted in such a manner that the outer ring thereof is in contact with the inner circumferential surface of the hole 60. Then, the leading end of the sun shaft 4 is fitted into the inner ring of the inner ball bearing 61. Further, an elastic body (second elastic member) 62 for supporting elastically the sun shaft 4 with respect to the carrier 8 is installed between the hole 60 of the carrier 8 and the inner ball bearing 61. The inner diameter of the hole 60 is greater than the outer diameter of the inner ball bearing 61, and a slight clearance, about a few hundredths of a millimeter, is provided between the inner circumferential surface of the hole 60 and the inner ball bearing 61. The elastic body 62 is installed so as to fill the clearance. An O-ring used for an oil seal, for example, is adopted as the elastic body 62. An endless groove 63 is formed on the inner circumferential surface of the hole 60 along the circumferential direction, and the elastic body 62 is attached to the carrier 8 so as to be fitted into the groove 63. Then, the inner ball bearing 61 is attached to the hole 60 in such a manner that the elastic body 62 is held between the inner circumferential surface of the hole 60 and the inner ball bearing 61. The elastic body 62 is held between the inner circumferential surface of the hole 60 and the inner ball bearing 61, thereby elastically deformed and attached firmly to them.

According to the above-constituted planetary roller reducer, the elastic body 62 for supporting elastically the sun shaft 4 is installed between the carrier 8 and the inner ball bearing 61. Therefore, even when gyrating motions are found on the input shaft 45 and the sun shaft 4, a core deflection developed on the sun shaft 4 resulting from the gyrating motions is absorbed by the elastic body 62 which undergoes an elastic deformation. Thereby, no excessive moment load will act on the inner ball bearing 61 for supporting the sun shaft 4. As a result, the reducer is improved in reliability.

In the present embodiment, the elastic body 62 is installed between the carrier 8 and the inner ball bearing 61. However, the elastic body may be installed between the inner ball bearing 61 and the leading end of the sun shaft 4. In this instance, the outer diameter of the leading end of the sun shaft 4 is smaller than the inner diameter of the inner ball bearing 61, and a slight clearance, approximately a few hundredths of a millimeter, is provided between them. The elastic body of the present embodiment is installed so as to fill the clearance.

In the above-described embodiments, an explanation has been made for a single stage-type reducer in which a pair of planetary rollers are assembled. The reducer of the present invention is also applicable to a multistage-type reducer in which plural pairs of planetary rollers are assembled in a stepwise manner, with the same effects as described above obtained.

An explanation has been made so far for preferred embodiments of the present invention, to which the present invention shall not be limited. The present invention may be subjected to addition, omission, replacement and other modifications while not departing from the scope of the present invention. The present invention shall not be limited to the above description but will be limited only by the scope of the attached claims.

INDUSTRIAL APPLICABILITY

The present invention relates to a planetary roller reducer directly coupled to a motor, which is provided with a casing, an input shaft accommodated inside the casing and directly coupled to an output shaft of a motor, an input shaft bearing set between the casing and the input shaft to support the input shaft so as to rotate with respect to the casing, a sun shaft installed on the input shaft, a carrier accommodated in the casing and supported so as to rotate, a plurality of planetary rollers supported on the carrier so as to rotate and in external contact with the sun shaft, an elastic ring accommodated in the casing and in internal contact with a plurality of the planetary rollers, and a first elastic member installed between the input shaft bearing and the input shaft or between the casing and the input shaft bearing to support elastically the input shaft.

The present invention relates to a planetary roller reducer directly coupled to a motor, which is provided with a casing, an input shaft accommodated in the casing, an input shaft bearing set between the casing and the input shaft to support the input shaft so as to rotate with respect to the casing, a sun shaft installed on the input shaft, a carrier accommodated in the casing, a plurality of planetary rollers supported on the carrier so as to rotate and in external contact with the sun shaft, and an elastic ring accommodated in the casing and in internal contact with a plurality of the planetary rollers, in which the input shaft is provided with an input shaft main body to which the sun shaft is coupled, a boss coupled to an output shaft of the motor, and a flexible coupling portion for coupling the input shaft main body to the boss, and the input shaft bearing is arranged between the casing and the input shaft main body.

According to the present invention, no excessive moment load acts on an input shaft bearing for supporting the input shaft, the output shaft of the motor directly coupled to the input shaft or the front bearing of the motor for supporting the output shaft. As a result, the reducer is improved in reliability.

The invention claimed is:

1. A planetary roller reducer, which is directly coupled to a motor comprising:
    a casing;
    an input shaft accommodated inside the casing and directly coupled to an output shaft of the motor;
    an input shaft bearing set between the casing and the input shaft to support the input shaft so as to rotate with respect to the casing;
    a sun shaft installed on the input shaft;
    a carrier accommodated in the casing;
    a plurality of planetary rollers supported on the carrier so as to rotate and in external contact with the sun shaft;
    an elastic ring accommodated in the casing and in internal contact with a plurality of the planetary rollers; and
    a first elastic member installed between the input shaft bearing and the input shaft or between the casing and the input shaft bearing to support elastically the input shaft.

2. The planetary roller reducer according to claim 1, wherein
    a fitting hole is formed on the input shaft, the inner diameter of the fitting hole being larger than the outer diameter of the output shaft of the motor, and
    a positioning mechanism for adjusting the relative position of the output shaft fitted into the fitting hole with respect to the input shaft is installed on the input shaft.

3. The planetary roller reducer according to claim 2, wherein
    when the size of a clearance between the outer circumferential surface of the output shaft of the motor and the inner circumferential surface of the fitting hole is denoted as G1 and the outer diameter of the output shaft is defined as D1, the ratio of G1 to D1 is in the range of 0.005% to 1.0%.

4. The planetary roller reducer according to claim 1, wherein
    a flange formed in such a manner that a socket portion of the motor fixed to the casing is fitted inside is installed on the casing.

5. The planetary roller reducer according to claim 4, wherein
    when the size of a clearance between the inside surface of the flange and the outside surface of the socket portion is denoted as G2 and the outer diameter of the socket portion fitted inside the flange is denoted as D2, the ratio of G2 to D2 is in the range of 0.05% to 2.50%.

6. The planetary roller reducer according to claim 1, wherein
    a joint element necessary for coupling an input shaft of a machine to be driven via the reducer is installed on the carrier.

7. The planetary roller reducer according to claim 1, wherein
    a carrier bearing for supporting the carrier so as to rotate with respect to the casing is set between the casing and the carrier.

8. The planetary roller reducer according to claim 7, wherein
    the carrier bearing is a cross roller bearing.

9. The planetary roller reducer according to claim 1 comprising:
    shaft portions installed on the carrier in the same number as the planetary rollers;
    a planetary roller bearing installed between the shaft portion and the planetary roller to support the planetary roller so as to rotate; and
    an inner-ring retaining member for retaining an inner ring of the planetary roller bearing at a predetermined position of the shaft portion in such a manner that the planetary roller bearing receives a thrust force developed on the planetary roller.

10. The planetary roller reducer according to claim 9, which is provided with an outer-ring retaining member for retaining an outer ring of the planetary roller bearing at a predetermined position of the planetary roller in such a manner that the planetary roller bearing receives a thrust force developed on the planetary roller.

11. The planetary roller reducer according to claim 1, which is provided with a sun shaft bearing installed between the leading end of the sun shaft and the carrier to support the leading end of the sun shaft so as to rotate with respect to the carrier and a second elastic member installed between the carrier and the sun shaft bearing or between the sun shaft bearing and the sun shaft to elastically support the sun shaft.

12. A planetary roller reducer, which is directly coupled to a motor comprising:

a casing;

an input shaft accommodated in the casing;

an input shaft bearing set between the casing and the input shaft to support the input shaft so as to rotate with respect to the casing;

a sun shaft installed on the input shaft;

a carrier accommodated in the casing;

a plurality of planetary rollers supported on the carrier so as to rotate and in external contact with the sun shaft; and an elastic ring accommodated in the casing and in internal contact with a plurality of the planetary rollers;

wherein the input shaft is provided with an input shaft main body to which the sun shaft is coupled, a boss coupled to an output shaft of the motor, and an elastic coupling portion for coupling the input shaft main body to the boss, and the input shaft bearing is arranged between the casing and the input shaft main body.

13. The planetary roller reducer according to claim 12, wherein the input shaft constitutes a bellows-type shaft joint.

14. The planetary roller reducer according to claim 12, wherein the input shaft constitutes a leaf spring-type shaft joint.

15. The planetary roller reducer according to claim 12, wherein the input shaft constitutes a metal slit-type shaft joint.

16. The planetary roller reducer according to claim 12, wherein a joint element necessary for coupling an input shaft of a machine to be driven via the reducer is installed on the carrier.

17. The planetary roller reducer according to claim 12, wherein a carrier bearing for supporting the carrier so as to rotate with respect to the casing is set between the casing and the carrier.

18. The planetary roller reducer according to claim 12 comprising:

shaft portions installed on the carrier in the same number as the planetary rollers;

a planetary roller bearing installed between the shaft portion and the planetary roller to support the planetary roller so as to rotate; and an inner-ring retaining member for retaining an inner ring of the planetary roller bearing at a predetermined position of the shaft portion in such a manner that the planetary roller bearing receives a thrust force developed on the planetary roller.

19. The planetary roller reducer according to claim 12, which is provided with a sun shaft bearing installed between the leading end of the sun shaft and the carrier to support the leading end of the sun shaft so as to rotate with respect to the carrier and a second elastic member installed between the carrier and the sun shaft bearing or between the sun shaft bearing and the sun shaft to elastically support the sun shaft.

* * * * *